May 10, 1966  K. F. ZIEGLER  3,250,240
STARTING MOTOR POWER TAKE OFF
Filed Nov. 24, 1961  3 Sheets-Sheet 1

INVENTOR.
KURT F. ZIEGLER
BY
Wheeler, Wheeler & Wheeler
ATTORNEYS

INVENTOR.
KURT F. ZIEGLER
BY
Wheeler, Wheeler & Wheeler
ATTORNEYS

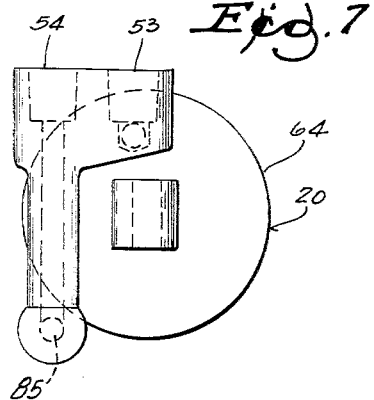
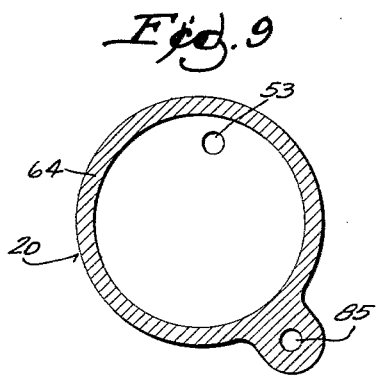
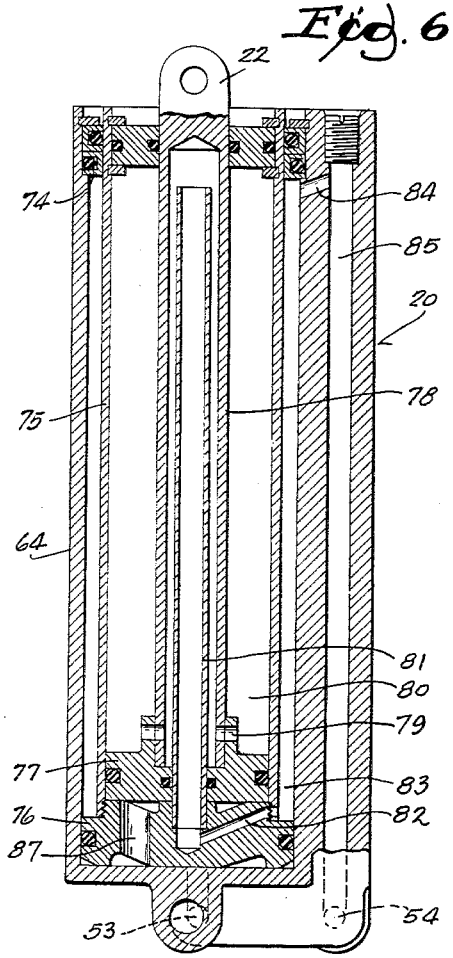
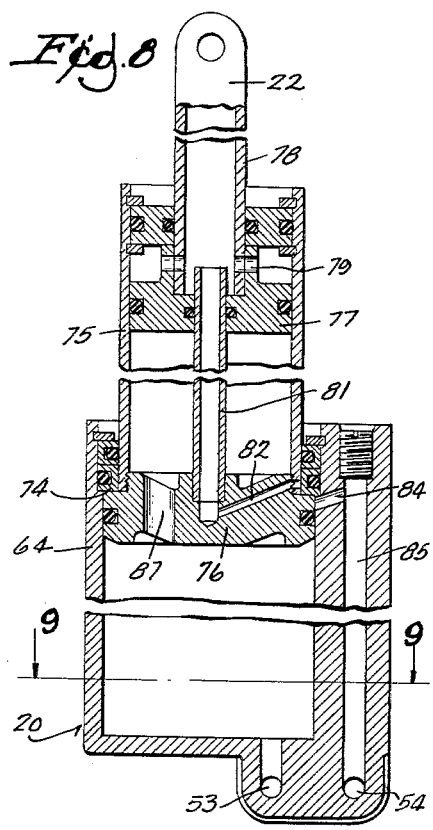
INVENTOR.
KURT F. ZIEGLER
BY
Wheeler, Wheeler & Wheeler
ATTORNEYS United States Patent Office 3,250,240
Patented May 10, 1966

3,250,240
STARTING MOTOR POWER TAKE OFF
Kurt F. Ziegler, Zion, Ill., assignor to Outboard Marine Corporation, Waukegan, Ill., a corporation of Delaware
Filed Nov. 24, 1961, Ser. No. 154,420
7 Claims. (Cl. 115—17)

This invention relates to a starting motor power take off. The generic object of the present invention is to use an electric starting motor as a source of power for any desired purpose, thus avoiding the necessity of having a separate motor.

To use the starting motor as a power take off it is only necessary to restrain the normal starting operation and to clutch the motor, instead, to some driven part other than the starting gear. In the case of a starting motor having a pinion which travels along the armature shaft to mesh with a flywheel gear, the pinion may be held out of mesh if the armature shaft has a separate clutch provided for power take off purposes.

While the invention is generic, it will be exemplified for purposes of this application by describing its application to an outboard motor structure in which an electric starting motor is selectively usable either for its normal engine-starting function or for the ancillary function of tilting the entire propulsion unit, possibly being controlled for this purpose from a remote point.

In the preferred construction herein disclosed, the power is applied hydraulically by means of one or more fluid pressure operated expansion members such as a pair of rams seated upon a boat transom and connected with the propulsion unit in positions such that as the ram pistons are extended the propulsion unit is caused to tilt between alternate positions of use and retraction. The retracted position to which the unit may be tilted facilitates highway transportation of a boat equipped with such a unit and it also facilitates the beaching of a boat so equipped. If the propulsion unit is part of an outboard motor, the engine mounted thereon is tilted with reference to the transom and the support or transom bracket which provides the seat against which the expansion members react.

The hydraulic rams are electrically controlled in the preferred apparatus discussed. Moreover, they preferably comprise double extension pistons and are double acting.

When it is desired to tilt the unit a push button control is used to energize the starting motor of the prime mover, which may comprise either an inboard engine or an outboard engine. However, a solenoid which is concurrently energized selectively prevents the starter motor pinion from meshing with the starting gear of the engine. In the same operation, a clutch is engaged with the armature shaft of the starting motor to drive a gear pump. A hydraulic valve controls the application of the hydraulic pressure to extend or retract the ram pistons to raise or lower the propulsion unit. In this particular embodiment, the valve is spring biased to a position appropriate for the lowering of the propulsion unit. For raising it, the valve is shifted in opposition to the bias.

When the starting motor is to be used for its normal engine starting function, a separate starter control energizes the motor but does not block out the starting pinion and does not connect the motor with the hydraulic pump.

It is noteworthy that the hydraulic pump circuit is one which tends to lock the propulsion unit in any position of tilt to which it is adjusted by power.

In the drawings:

FIG. 6 is a view in axial section through a contracted double acting ram with double extension pistons.

FIG. 7 is a bottom plan view of the ram shown in FIG. 6.

FIG. 8 is a view similar to FIG. 6 fragmentarily illustrating the two pistons of the ram in their extended positions.

FIG. 9 is a view taken in transverse section on line 9—9 of FIG. 8.

Figures 1, 2:
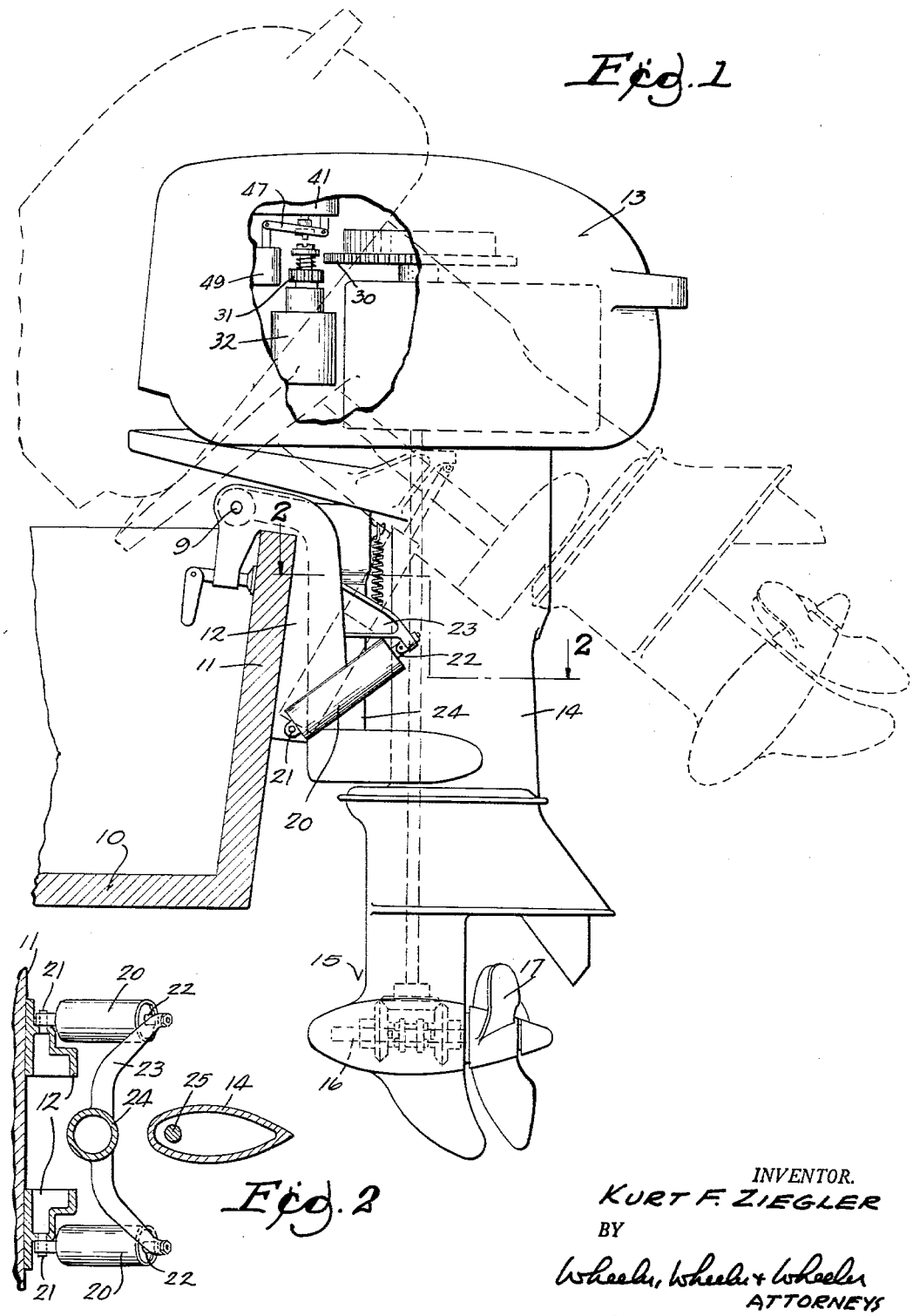
FIG. 1 is a view in side elevation of an outboard motor in which the invention is embodied, a boat being fragmentarily illustrated in section and a tilted position of the outboard motor being shown in dotted lines.
FIG. 2 is a view taken in section on the line 2—2 of FIG. 1.

The boat 10 is merely fragmentarily illustrated to show a transom 11 to which a conventional transom bracket 12 is clamped. It will be understood that this is merely a representative illustration, since the invention is also applicable to the outboard drive of an inboard motor.

In the instant device the propulsion unit comprises an engine or power head 13 at the upper end of a shaft housing strut 14 which is conventionally pivoted at 9 to tilt respecting the bracket 12 from the upright position shown in full lines to the tilted retracted position shown in dotted lines. At the lower end of strut 14 is the so called lower unit or gear housing 15 from which projects a propeller shaft 16 carrying propeller 17.

Figure 3:
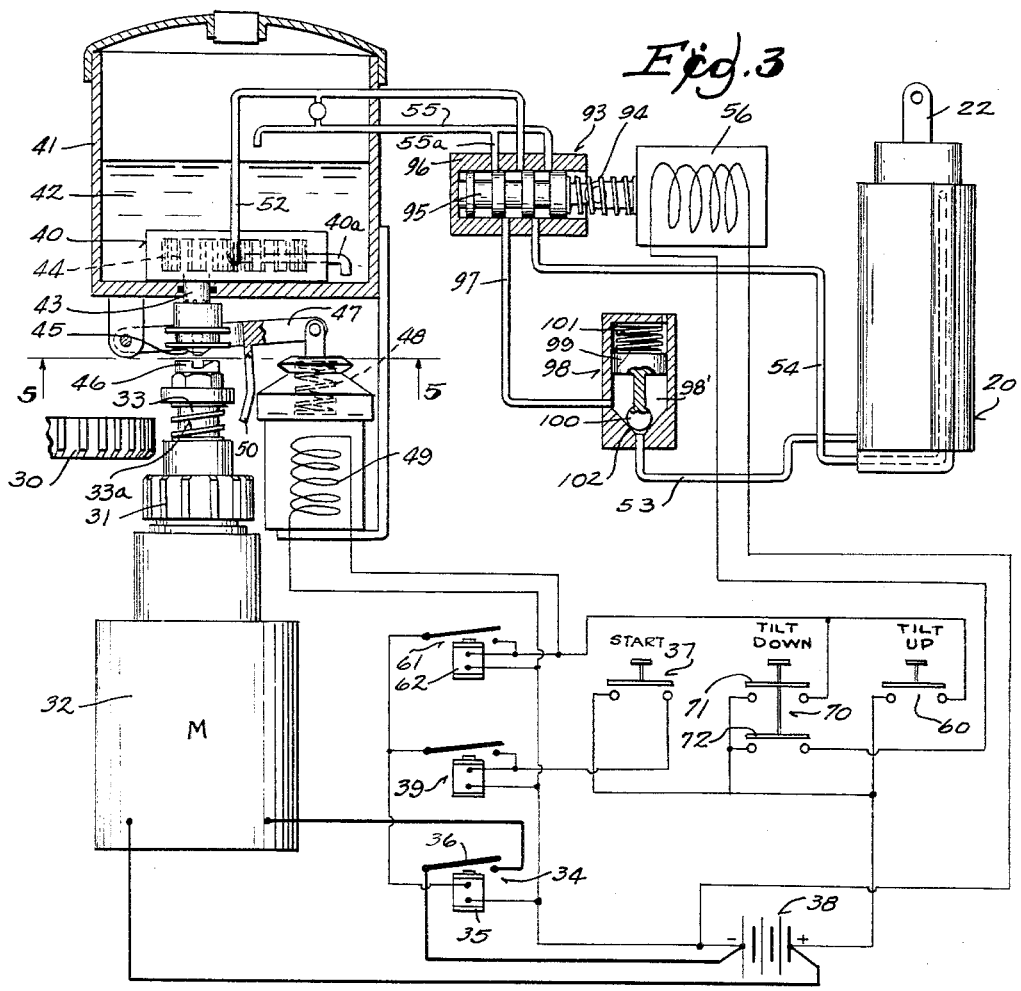
FIG. 3 is a hydraulic and electrical circuit diagram, certain mechanical parts being shown in section.

For controlling the tilted position of the propulsion unit, it is preferred to employ not one, but two, hydraulic rams 20 which are connected in parallel, only one being shown in the diagram of FIG. 3. The ram means 20 are pivoted at 21, 21 to the transom bracket 12 which provides a convenient anchorage on the boat transom 11. The thrust means 22, 22 of the respective rams 20 connect to the cross head 23 which is attached to the swivel or steering bearing 24 that is a conventional part of the propulsion unit of a dirigible outboard motor such as here exemplifies the invention.

The strut 14 serves as a housing for the engine driven shaft 25 which drives the propeller 17.

In accordance with usual practice, the engine has a flywheel ring gear 30 (FIG. 3) with which the conventional "Bendix" drive 33a normally engages pinion 31 when the starting motor 32 is energized to rotate the armature shaft 33. The motor receives power subject to the control of the starting relay 34, the coil 35 of which attracts the relay switch arm 36 when energized by the manual switch 37 from the battery 38. Optionally the starting switch 37 acts through relay 39 to supply current to the coil 35 of relay 34.

In accordance with the present invention a hydraulic gear pump is provided at 40, immersed in a reservoir 41 which contains hydraulic liquid 42. The pump intake 40a draws hydraulic fluid from the reservoir. The drive shaft 43 for the drive gear 44 of the pump 40 extends out of the reservoir and is equipped with a driven clutch element 45 selectively engageable with a complementary driving clutch element 46 on the end of the armature shaft 33. Drive clutch element member 45 is actuated to and from engagement with the driving clutch member 46 by means of a shifting lever 47 biased by spring 48 to clutch releasing position. The clutch is engaged electromagnetically by solenoid 49 against the bias of spring 48.

Figure 4:
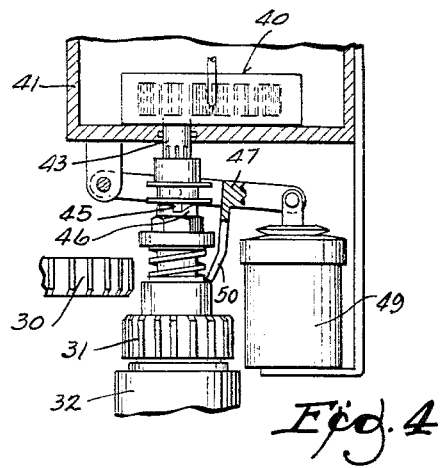
FIG. 4 is a detail view similar to a portion of FIG. 3 but with the parts in the positions which they occupy when a tilting operation is in progress.
Figure 5:
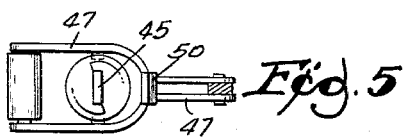
FIG. 5 is a detail view taken in section on the line 5—5 of FIG. 3.

Carried by the clutch operating lever 47 is an arm 50 which is normally in the position shown in FIG. 3. However, when the clutch is engaged, as shown in FIG. 4, the arm 50 moves into the path of the pinion 31 to prevent the engine connecting movement of the pinion engagement with the flywheel ring gear 30.

Thus, when the hydraulic pump 40 is operative, the starting motor 32 does not drive the engine through the pinion 31 and starting gear 30. Instead, the power of the starting motor is used to tilt the propulsion unit to or from its operative position. For this purpose, the pump output passes through the pressure line 52 from the pump 40, subject to the control of a valve, generically designated by reference character 93, which determines whether the hydraulic power will be used to elevate or lower the propulsion unit.

The spool valve 95 is urged by spring 94 to the position in casing 96 which is illustrated in FIG. 3. In this position, the pressure line 52 communicates with duct 97 which leads to a combination pressure and check valve 98. The piston 99 carries valve member 100 and is subject to the action of a spring 101 which urges valve member 100 to its seat 102, closing the outlet duct 53. When pressure is communicated into the cylinder 98' below the piston 99, the piston moves upwardly against the bias of spring 101 to lift the ball 100 from its seat 102 and to permit liquid to flow under pressure of the pump through duct 53 to the ram or rams 20 hereinafter to be described. Return flow passes through duct 54 from the ram means through the casing 96 of control valve 93 and thence through the discharge duct 55 back to the reservoir 41.

If the solenoid 56 is energized to draw the spool valve 95 to the left against the bias of spring 94, the pump pressure is communicated from the pressure line 52 to the duct 54 to reverse the operation of the ram. In that event, the return from the ram traverses duct 53 from right to left as viewed in FIG. 3, and the valve 100 functions like an ordinary spring-biased check valve to permit the flow to return through duct 97 to the valve casing 96 and thence through branch duct 55a to duct 55 for discharge into the reservoir. Spring 101 resists the opening of the check valve with sufficient pressure to hold the propulsion unit tilted until the hydraulic pressure is applied in a lowering direction.

The manually operative switch 60 controls the upward tilting of the propulsion unit from the operative full line position shown in FIG. 1 to the tilted or retracted position in which the unit 14 is shown in dotted lines. When switch 60 is closed, a relay 61 is energized to energize relay 35 and start the motor 32. In parallel with the coil 62 of relay 61 is the solenoid 49 which acts on arm 47 to clutch the hydraulic pump shaft 43 to the armature shaft of motor 32 and to prevent engagement of pinion 31 with ring gear 30. Thus the pump is set in operation without starting the engine which serves as a prime mover for the propulsion unit. Moreover, the spool valve 95 being biased to the position shown in FIG. 3, the hydraulic power is communicated as above described to the bottom of the ram cylinder 64 of ram 20. As will appear hereinafter when the ram means is described, this extends the piston rod 22 to elevate the propulsion unit. The seating of the valve 100 whenever the circuit to the motor 32 is opened, will lock the propulsion unit in whatever position it occupies at the time.

The manually operable switch 70 is used for lowering the propulsion unit toward the operative position shown in full lines in FIG. 1. When this switch is closed, its upper contact 71 closes the circuit through relay 61, exactly as in the case of the tiltup switch 60. This starts the motor 32 and blocks the pinion 31 from meshing with the flywheel gear 30, at the same time clutching motor 32 to the hydraulic pump 40. The lower contact 72 of switch 70 closes a circuit through the solenoid coil 56 thereby moving the spool valve 95 from left to right in the casing 96 of the control valve 93 shown in FIG. 3. This places the pressure line 52 in connection with duct 54 which leads to the top of the ram 20 for lowering the piston means therein. The return is through duct 53, check valve 100, duct 97, and branch duct 55a to the discharge duct 55, leading to the reservoir.

To permit the desired compact organization of the ram means, the structure is preferably as shown in FIGS. 6 to 9.

The outer ram cylinder 64 has packing 74 which guides the tubular rod 75 and limits the outward movement of piston 76. Rod 75 also serves as a cylinder for the piston 77, with which the thrust means 22 is connected. The thrust means 22 comprises a tubular rod 78 connected with the inner piston 77 and in communication through the lateral port 79 with the cylinder chamber 80 which lies within the outer piston rod 75.

The interior of the tubular inner piston rod 79 also communicates through the tube 81 with a lateral port 82 provided within the outer piston 76 and leading to the annular space 83 between the outer piston rod 75 and the cylinder 64. At the outer end of the cylinder 64, the space 83 communicates through port 84 with the duct 85 extending axially of the ram from duct 54 above described.

In the retracted position of the parts shown in FIG. 6, the admission of hydraulic liquid under pressure through duct 53 consequent upon the closing of switch 60 will cause piston 76 and its tubular rod 75 to move outwardly toward the position of the parts fragmentarily illustrated in FIG. 8. When the piston 76 strikes the packing 74 and stops, pressure will be communicated through the port 87 in piston 76 against the lower face of piston 77, whereupon the inner piston 77 will continue to move the thrust means 22 outwardly until piston 77 likewise reaches the extreme of its movement as shown in FIG. 8.

Meantime, the liquid displaced by the advancing pistons is permitted to escape via ports 79, tube 81 and duct 82 and annular passage 83, port 84 and duct 85 to the return duct 54 as already described.

It will be understood that the motion does not necessarily continue to the extreme indicated in FIG. 8, but may be arrested at any desired point by releasing the manually operable switch 60 which is normally open. The propulsion unit will thereupon remain in the position to which it has been adjusted.

For the converse operation, the manually operable and normally open switch 70 is closed. Again the motor 32 is operated, and engagement of the starting pinion with the starting gear is prevented, the motor being clutched to the hydraulic pump 40 and the spool valve 95 being moved to the right by energization of solenoid 56 to reverse the flow to the ram means. The liquid under pressure will now enter the ram means through duct 54, duct 85, and port 84. The pressure in the annular chamber 83 between the inner and outer cylinders 75 and 64 will be exerted downwardly on piston 76 to return it from its advanced position toward the retracted position of FIG. 6. Pressure will also be exerted through duct 82 and tube 81 and the interior of the hollow piston rod 78 and through the lateral ports 79 to reach the interior of the inner cylinder 75 which also serves as a piston rod for piston 76. In the interior of rod 75 the pressure is now exerted on top of piston 77 whereby that piston is forced from its advanced position to the retracted position of FIG. 6. The liquid displaced by the pistons in the course of their movement from the FIG. 8 position to that of FIG. 6, escapes through passage 87 to duct 53 and returns to the reservoir as above described.

Because of the two stage ram, the ram is extremely compact. Yet, the combined extension of its two pistons enables the ram to tilt the propulsion unit 14 as desired.

I claim:
1. A marine propulsion device including an engine having a starting motor, a lower unit having means for pivotally mounting said lower unit for tilting on a transverse axis between positions of use and retraction, a double acting hydraulic ram including a cylinder and an extensible piston, said hydraulic ram having a connection to said lower unit for tilting thereof, means for selectively applying fluid pressure to said piston in each of two directions of movement, and means for using said starting motor for developing the fluid pressure.

2. A marine propulsion device including an engine having a starting motor, a lower unit having means for pivotally mounting said lower unit for tilting on a transverse axis between positions of use and retraction, a double acting hydraulic ram including a cylinder with fluid connections at both ends, and an extensible piston, said hydraulic ram having a connection to said lower unit for the tilting thereof, a pump, means for drivingly connecting said motor and said pump, and a reversing valve connected to said pump and to said fluid connections and including a casing and a valve member movable in said casing for directing the fluid pressure from the pump selectively to the opposite ends of said cylinder.

3. A marine propulsion device including a boat mounted support, a lower unit pivotally connected to said support and including a propeller, power transmitting means for tilting said lower unit in opposite directions between positions of use and retraction, an engine remote from said propeller, a starting motor operatively connected to said engine, and means for selectively connecting said starting motor to said power transmitting means for tilting said lower unit to afford selective lower unit tilting in each of said opposite directions.

4. A marine propulsion device including a boat mounted support, a lower unit pivotally connected with said support and including a driveshaft and a propeller connected to said driveshaft, an engine remote from said propeller having means drivingly connected with said driveshaft, a starting motor for said engine, means for tilting said lower unit between positions of use and retraction, a hydraulic ram connected between said lower unit and said support and including relatively extensible cylinder and piston means, a pump, and hydraulic conduits in operative connection between said pump and said ram, and means for selectively clutching said starting motor to said pump for the operation of said pump.

5. A marine propulsion device comprising a boat mounted support, a lower unit pivotally connected to said support and including a propeller, an engine including a starting gear, a starting motor for said engine, said starting motor including a drive pinion meshable with said starting gear for starting said engine, a hydraulic pump, a hydraulic ram having an extensible member operatively connected with said lower unit, hydraulic connections between said pump and said ram, disengageable clutch means for connecting said starting motor with said pump, and means for engaging said clutch means to drive said pump by said starting motor and for preventing said pinion from meshing with said starting gear when said clutch is engaged to drive said pump.

6. The combination set forth in claim 5 in which the means for engaging the clutch comprises a clutch shifting lever and the means for preventing the pinion for driving the gear comprises an arm on said lever movable to and from the path of the pinion, the starting motor having means for normally shifting the pinion into mesh with the gear when the starting motor is energized and when said arm is not in the path of said pinion.

7. A marine propulsion device including a boat mounted support, a lower unit including a propeller, means tiltably connecting said support and said lower unit for lower unit movement between positions of use and retraction, an engine remote from said propeller, at least one two-stage double acting ram operatively connected with said propulsion unit and having concentric pistons, hydraulic connections extending from the opposite faces of said pistons, a pump including a reversing valve connected to said hydraulic connections for alternatively supplying the hydraulic output of said pump through said connections to said opposed faces of said pistons, and a starting motor including means for driving connection with said engine for starting thereof and means for driving connection with said pump.

References Cited by the Examiner
UNITED STATES PATENTS

| | | | |
|---|---|---|---|
| 2,020,200 | 11/1935 | Moore | 123—179 |
| 2,448,467 | 8/1948 | Rockwell | 60—52 |
| 2,504,833 | 4/1950 | Hann | 115—17 |
| 2,927,552 | 3/1960 | Mickey | 115—41 |
| 2,972,328 | 2/1961 | Hodgson | 115—41 |
| 3,008,445 | 11/1961 | Frank | 115—41 |
| 3,024,758 | 3/1962 | Lieber | 115—41 |

FERGUS S. MIDDLETON, *Primary Examiner.*

MILTON BUCHLER, R. DAVID BLAKESLEE,
*Examiners.*

A. MITCHELL, A. H. FARRELL, *Assistant Examiners.*